(12) United States Patent
Gregson et al.

(10) Patent No.: US 6,236,737 B1
(45) Date of Patent: May 22, 2001

(54) DYNAMIC TARGET ADDRESSING SYSTEM

(75) Inventors: Peter H. Gregson, Halifax; Steve M. Franklin, Dartmouth, both of (CA)

(73) Assignee: Dalhousie University, Halifax (CA)

( * ) Notice: Subject to any disclaimer, the term of this patent is extended or adjusted under 35 U.S.C. 154(b) by 0 days.

(21) Appl. No.: 09/046,702

(22) Filed: Mar. 24, 1998

Related U.S. Application Data
(60) Provisional application No. 60/041,537, filed on Mar. 26, 1997.

(51) Int. Cl.[7] .................................................. G06K 9/00
(52) U.S. Cl. ........................... 382/103; 382/153; 382/113
(58) Field of Search .................................. 382/100, 103, 382/106, 107, 118, 153, 154, 285, 291, 113; 345/203, 433, 473, 474; 395/518

(56) References Cited

U.S. PATENT DOCUMENTS

| | | | |
|---|---|---|---|
| 4,497,065 | * 1/1985 | Tisdale | 382/1 |
| 4,631,676 | 12/1986 | Pugh . | |
| 4,706,296 | * 11/1987 | Pedotti et al. | 382/42 |
| 4,887,223 | * 12/1989 | Christian | 364/518 |
| 4,928,175 | 5/1990 | Haggrén . | |
| 5,214,615 | 5/1993 | Bauer . | |
| 5,227,985 | 7/1993 | DeMenthon . | |
| 5,388,059 | 2/1995 | DeMenthon . | |
| 5,422,828 | 6/1995 | Choate et al. . | |
| 5,572,251 | 11/1996 | Ogawa . | |
| 5,592,401 | 1/1997 | Kramer . | |
| 5,594,856 | * 1/1997 | Girard | 395/173 |
| 5,706,362 | * 1/1998 | Yabe | 382/103 |
| 5,768,415 | * 6/1998 | Jagahar | 382/154 |
| 5,878,151 | * 3/1999 | Tang | 382/103 |
| 5,930,379 | * 7/1999 | Rehg | 382/107 |

OTHER PUBLICATIONS

Steve Franklin, A Real–Time Interactive Motion Tracking System, Thesis Technical University of Nova Scotia, pp. 1–82 1997.

N. Goddard, "The Interpretation of Visual Motion: Recognizing on Moving Light Displays", in Workshop on Visual Motion, Proc., pp. 212–220, IEEE Computer Soc. Press, Mar. 1989.

C. Cedras & M. Shah, "A Survey of Motion Analysis from Moving Light Displays", in 1994 IEEE Computer Soc. Conf. on Computer Vision & Pattern Recognition, Proc., pp. 214–221, IEEE Comp. Soc. Press Jun. 1994.

I. Sethi & R. Jain, "Finding Trajectories of Feature Points in a Monocular Image Sequence", IEEE Trans. Pattern Anal. Mach, Intell, vol. PAMI–9, No. 1, pp. 56–72, Jan. 1987.

(List continued on next page.)

*Primary Examiner*—Joseph Mancuso
*Assistant Examiner*—A Tabatabai

(57) ABSTRACT

The present invention relates to an improved system and method for target motion tracking, that reduces the computational resources required, by providing for the dynamic control of the activation of targets. The present invention is comprised of a system for use in dynamically tracking the movement of a subject. A plurality of active targets are located on the subject at positions of movement of the subject. At least one camera is arranged for viewing the subject, wherein each of the at least one camera outputs a video signal. A computer receives the video signal of each and processes each video signal by means of an algorithm program to produce a control signal. A control unit is connected to the computer and to the plurality of active targets and receives the control signal and processes it to produce activation signals for selectively activating ones or groups of active targets so that the computer means can efficiently determine the movement of the active targets and thereby determine the movement of the subject.

13 Claims, 4 Drawing Sheets

OTHER PUBLICATIONS

J. Weng, T. Huang & N. Ahuja, "3–D Motion Estimating, Understanding, and Prediction from Noisy Image Sequences", IEEE Trans. Pattern Anal. Mach, Intell, vol. PAMI–9, No. 3, pp. 370–388, May 1987.

W. Thompson, P. Lechleider & E. Stuck, "Detecting Moving Objects Using the Rigidity Constraint", IEEE Trans. Pattern Anal. Mach, Intell, vol. 15, No. 2, pp. 162–165, Feb. 1993.

* cited by examiner

DYNAMIC TARGET ADDRESSING SYSTEM

CROSS RELATED APPLICATION

This application is a continuation of applicant's co-pending U.S. Provisional patent application No. 60/041,537, filed Mar. 26, 1997.

BRIEF INTRODUCTION

The present invention relates to a system for dynamically addressing targets located on a moving object so that their motion may be viewed by a plurality of cameras and stored in a computer.

According to the present invention, the computer is connected to a device which controls the activation of active targets based on an algorithm stored in the computer that is sensitive to the motion of the targets so that selected groups of targets are activated more often that of other selected groups. This allows the computer to track the motion of the entire moving object in an efficient manner so as to minimize the amount of computing time and power necessary. By employing the present invention multiple targets can be tracked through complex degrees of motion to provide "real time" tracking of the subject using a relatively moderately powerful computer.

The tracking of deformable mobile objects is rapidly becoming a field of interest in a variety of applications in the areas of industry and entertainment.

The problem of interpreting a dynamically changing visual scene has made motion tracking a cumbersome and difficult task, requiring computers to interpret and assess motion in a complicated real-world scene. In order to simplify the task of tracking objects by machines, targets can be placed on an object, avoiding the need to recognize and track arbitrary outlines, of, for example, the arms, hands, and legs of a person in motion.

The targets can be passive targets, such as a white disc fastened onto critical locations of the clothing of a person being observed. The clothing of the person and the background must then be made to contrast with the targets. The cameras can then distinguish between a target and the moving parts of the subject and the background. The more contrast between the target and its surroundings, the better the signal to noise ratio of the system.

Active targets create a better signal to noise ratio and eliminate the need to provide contrasting colors between the subject and background and the targets. One such active target can be a light emitting diode LED. One preferred type of LED emits in the near infrared NIR part of the spectrum. By placing a filter over the lens of the cameras tracking the targets, the NIR sources can be clearly distinguished from any passive background, and the signal to noise ratio of the system is improved.

A number of systems using active targets are currently being developed in a variety of applications. A few of these systems use visible light sources as targets, others use infrared and near infrared sources. There are also systems available based on magnetic and radio active targets. The limitations on prior art efforts have included available computer power, exorbitant cost, active target control, and real-time implementations. Limitations have been due in part to the approaches that have been taken.

To realistically track a complicated, deformable object with many degrees of freedom, a large number of targets must be placed on the object to assist in the interpretation of rotation, bearing, and azimuth of the various moving parts.

An object may require greater than 60 targets to adequately describe its motion. In an active or passive system where all targets are visible for an entire frame, geometric reconstruction from multiple two-dimensional views to a three-dimensional coordinate system must be performed on all 60 targets at once. When the combinations and permutations of 60 targets with many degrees of freedom are considered, the complexity of the solution is very large.

In order to simplify the computational burden of such a task, a number of constraints must be applied. When tracking a human, these constraints include inverse kinematics (IK) and dynamics. The general assumption of IK is that angles are constrained to certain ranges due to physiological limitations. Dynamic constraints reflect the fact that the human body can only achieve limited acceleration resulting in a maximum displacement over a given time interval. Finally, assumptions with respect to target location can be made by assuming limb connectivity. This means that the wrist must be somewhere nearby the elbow by definition.

The complications involved in tracking deformable objects affect the complexity of algorithms that must interpret and identify the scene of many targets. Not only is it difficult to develop a robust algorithm to deal with such a situation, but geometric reconstruction algorithms are generally very computer intensive. The most common algorithm implementation in commercial systems is a derivative of global optimization, which is a relatively "brute force" method of finding the best orientation of targets given a set of constraints. Because of the computational complexity of the algorithms, one must trade off response time of the system for cost. Most systems have significant delays between motion and successful tracking, due to the computational delay of the system. Parallel processing units are often implemented in an attempt to shorten the computational delay. This results in very expensive systems that are either real-time or have a short delay, or inexpensive systems that require large intermittent waits after one or two minutes of motion capture.

Many of these systems will not achieve real-time performance without significant investment in powerful computing architecture. The inventors are not the first to use NIR targets, or to enhance the signal to noise ratio of such targets using CCD cameras and suitable filters. The system of the present invention does use a more sophisticated algorithm enabling the active targets, such as to reduce the computational task of target tracking a real-world object to within the capability of a single Pentium (trademark) processor.

In one particular embodiment of the present invention, CCD cameras have been combined with a Kodak (trademark) 87C Wratten (trademark) filter to block out the visible spectrum. Using this embodiment, exceptional signal to noise ratios have been achieved in natural lighting settings without any need for blue screening of the background or the tracked object.

The main challenges in target motion tracking in general are the occlusion and the correspondence problems. Interpreting and tracking 60 targets is further complicated by the fact that paths of targets may often intersect one another. In the case of the human actor, when two wrists cross over one another one target will temporarily disappear then reappear a few frames latter. This is known as occlusion. Interpreting this phenomenon and distinguishing between a clap and crossing of the wrists is difficult. When a virtual actor is running, ambiguity between left and right sides of the individual can prove to be difficult to identity.

These two problems, occlusion and correspondence are difficult problems to solve in target tracking and are discussed below.

The correspondence problem in geometrical reconstruction is primarily the challenge of associating features in one frame of a video signal with those of the next consecutive frame. With one visible target, the correspondence problem is immediately solvable as there is only one obvious match for a single feature in multiple images. However, with a large number of features being tracked in time, the correspondence of multiple features can be quite difficult to establish. This problem is particularly evident for segmented or limbed objects that have many degrees of freedom, making it difficult to differentiate between different motions. Most manufactures of motion tracking apparatus solve the correspondence problem through a brute force optimization method, considering the possible orientations of the tracked object and attempting to force the skeletal structure to the array of recorded features. This method can be improved upon by considering trajectories obtained from previous frames. The disadvantage of this method is the huge computational complexity involved in global optimization of a large number of features.

A target is occluded when it is not observable from one or more of the cameras, and appears to have disappeared from view. This becomes a significant problem for methods that expect to track trajectories from frame to frame, as missing data points will affect the success of an algorithm that does not account for disappearing features. Even more confusing is the fact that points will then re-appear (disocclusion) and the algorithm must determine which location the reappearing feature belongs to. Simultaneous occlusion of multiple targets can cause problems for standard systems because a lack of information will reduce the efficiency of the algorithm in two ways. It will complicate the system's ability to track the occluded features during their occlusion and after, and it will reduce the amount of information the system has available to perform global optimization. With less points to constrain to the skeletal model, the certainty of the resulting orientation is decreased.

Because many present motion capture systems observe all features simultaneously, there is a strong reliance on sufficient information being available from the features. Occlusion decreases the reliability of the method. As well, because motion capture systems have no means of labeling or "naming" feature targets, recovering from occlusion is not easily possible.

There is one system in the prior art known as OptoTRAK 3020 (trademark) where it was attempted to reduce the number of visible LED's for a given frame. By using multiple high-speed NIR sensitive CCD arrays and sequentially strobing the LEDs on the tracked object, the computing system views only one LED at a time. This simplifies the correspondence problem and identification of occlusion, since only one LED is illuminated per frame. However, this leaves occlusion of an LED to chance rather than prediction, and does not permit groups of LEDs to be illuminated at once. It is also an expensive system that requires the use of high speed cameras.

One prior art system is known as Ultra Trak 3DSpace (trademark). This system uses magnetic targets and magnetic detection systems to track the targets. It is very susceptible to magnetic field distortion caused by other magnetic objects close to the field of view, such as elevators and the like.

Another prior art system is known as Expert Vision HiRES 3D System (trademark). This system uses passive targets and so it cannot dynamically group the targets as can the present invention and then selectively activate certain groups.

SUMMARY OF THE INVENTION

The present invention recognizes the problem of occlusion and correspondence and allows a computer of relatively low power to track and process information from a plurality of targets. The present invention realizes that as the motion in a scene progresses, the tracking of certain targets or groups of targets is more important than the tracking of other targets or groups of targets from the standpoint of accurately determining the entire motion of a subject. For example, if the object is a human and the human is standing and moving his or her arms, the targets located on the feet, ankles and legs do not have to be tracked as often as the targets on the arms, wrists and hands in order to completely determine the motion of the subject. The present invention, analyses the movement of the entire subject and determines which targets are more important than others from a tracking standpoint. The computer, via a serial connection, then feeds back this information to a device known as a data communications module (DAQ) in the form of a coded set of instructions. The DAQ is connected by wires to all of the NIR LEDs. Depending on the set of coded instructions, certain ones or groups of LEDs are activated and certain ones or groups of LEDs are not activated per frame of video observation of the subject. This reduces the number of targets, and separates near targets, that the computer must process for any given frame of observation by the cameras and thereby reduces the amount of computing power necessary to completely determine the full motion of the subject.

In one embodiment, the serial connection between the computer and the DAQ was employed. It should be noted that the present invention is not limited to such a configuration. A wireless system could also be used to send information from the computer to the DAQ.

For example, in one embodiment of the present invention, the algorithm is designed to keep track of relative motion of the targets from frame to frame. If the algorithm determines that a particular target or group thereof is moving at a low or negligible velocity, it can decrease the frequency with which it illuminates these targets until it identifies an increase in the velocity (and acceleration) that justifies a higher sampling rate. This reduces the total number of targets that the system must track and process at any given time, thereby reducing the computer power necessary to completely determine the motion of the subject. In addition this inventive process increases the computing speed so that "real time" motion tracking is possible.

In another example, in another embodiment of the present invention, the algorithm considers two separate targets approaching each other, such that a correspondence problem is likely to occur in future frames. The algorithm assigns these targets to separate activation frames, so it can be determined which target is which in the near future, thereby alleviating the correspondence problem.

In general the algorithm program runs in the computer every frame or series of frames of scanning by the camera array. The algorithm program ranks all targets in a priority order based upon such criteria as recent target velocity, proximity to other targets, time since last tracked, and time since last seen, i.e. the target has been occluded. The algorithm then selects the top priority N targets to illuminate on the next frame.

The computer then sends control bytes to the DAQ, synchronized with the video, telling the DAQ which targets to turn on and off for the next frame or few frames. These turned-on targets, having been scanned, would then drop down in priority order, and a new set of targets would be selected. The new set of targets might include some high velocity or occluded targets from the last set of targets.

One example of an algorithm that can be used in accordance with the present invention is set out in the publication entitled "A Real-Time Interactive Motion Tracking System" by Steven Franklin, which is a thesis submitted to the Faculty of Engineering at the Technical University of Nova Scotia, Canada, and which was made available to the public on Mar. 26, 1997. This document is incorporated herein by reference. The algorithm in question is specifically described beginning at page 47 of the publication in Section 3.8.

In accordance with one aspect of the present invention there is provided a system for use in dynamically tracking the movement of a subject comprising: a plurality of active targets for location on the subject at positions of movement of the subject; at least one camera means for viewing the subject, each said at least one camera means having as an output a video signal; a computer means for receiving the video signal of each of said at least one camera means, said computer means processing each said video signal by means of an algorithm program to produce a control signal; and control means connected to said computer means and to said plurality of active targets, said control means receiving said control signal and processing said control signal to produce activation signals for selectively activating ones or groups of said active targets so that said computer means can determine the movement of said active targets and thereby determine the movement of the subject.

In accordance with another aspect of the present invention there is provided a method of dynamically tracking the movement of a subject comprising the steps of: placing an array of active targets on the subject, said targets being located at positions of movement of said subject; illuminating each of the array of active targets; observing the illumination of said array of active targets with at least one camera means, each camera means of said at least one camera means providing a video signal; processing each said video signal by a computer means using an algorithm program to provide a control signal; and processing said control signal with a target illumination control device connected to the computer means and the array of active targets to control the illumination of targets or groups of targets in the array of active targets.

BRIEF DESCRIPTION OF THE DRAWINGS

The present invention will be described in detail hereinbelow with the aid of the accompanying drawings in which.

DETAILED DESCRIPTION

Figure 1:
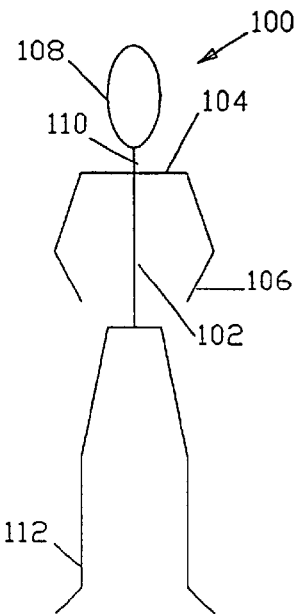
FIG. 1 is a schematic diagram of a human subject.
Figure 2:
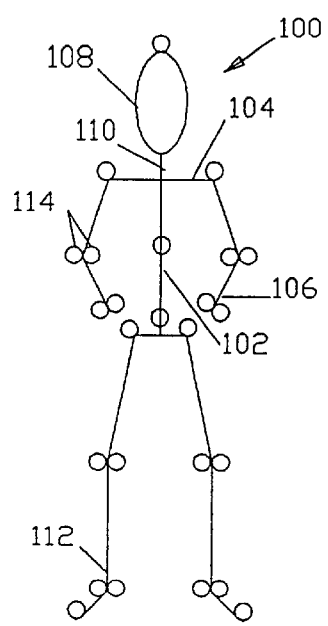
FIG. 2 is a schematic diagram of the subject of FIG. 1 showing the location of tracking targets for use in an embodiment of the present invention.

FIGS. 1 and 2 show a schematic diagram of a human figure 100. The human figure 100 has appendages that move with respect to a torso 102. It should be understood that certain appendages move farther afield and faster than others. For example, the shoulder 104 cannot move very much with respect to the torso 102, but the wrist 106 can move a great deal. Similarly the head 108, which is attached to the torso 102 by the neck 110 cannot move a great deal with respect to the torso 102, but the ankle 112 has a greater range of motion. In addition, the wrist and the ankle to a slightly lesser extent has a great freedom of motion. For example the wrist can move in all degrees of motion in the three-dimensional field as well as rotate.

In order to observe, using one or more cameras, the motion of the subject and his/her various appendages, a plurality of targets are attached to the subject as is shown in FIG. 2. In those locations, such as the elbow, wrist, knee and ankle more than one target, typically shown as 114 in FIG. 2, is attached. This helps the tracking of those areas of the subject that are subjected to a greater degree of motion.

Figure 3:
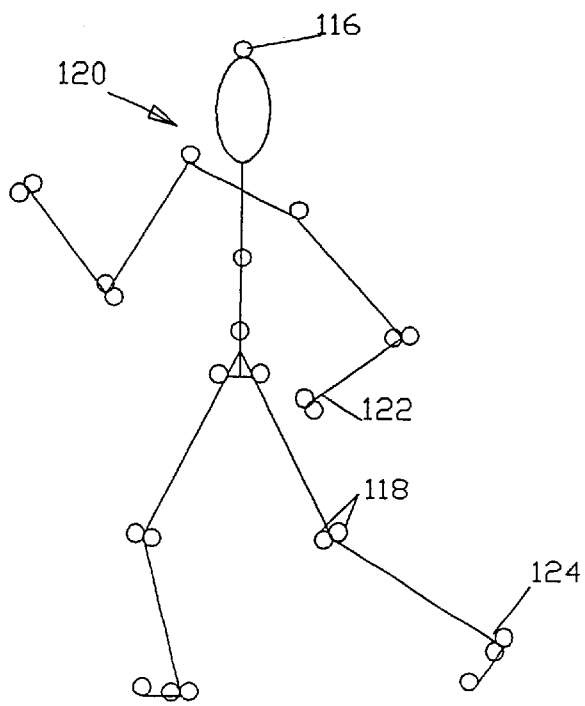
FIG. 3 is a schematic diagram of a subject in motion including the location of tracking targets.
Figure 4:
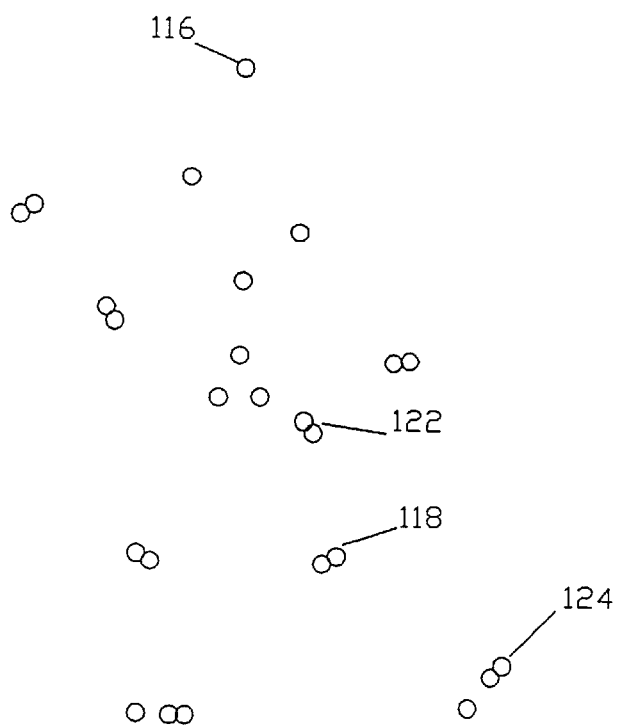
FIG. 4 is a diagram of just the location of the targets of the subject of FIG. 3.

FIGS. 3 and 4 illustrate the problem of correspondence. FIG. 3 shows a moving subject 120 including a plurality of targets, typically shown as 116 and 118. As the subject 120 moves in the field of view of the cameras the targets move in unison. If the appendages of the subject are removed from the field of view of the cameras only the targets remain as is shown in FIG. 4.

FIG. 4 would represent the frozen, instantaneous location of a multiplicity of targets located on subject 120 as seen by the cameras, which see only the targets as a result of the near infrared emission, and the filter located on the camera lenses. In other words, FIG. 4 represents one frame of a video image of one of the cameras observing the subject. The multiplicity of targets will all move to a lesser or greater extent, depending on their location on the subject from one frame to the next. The difficulty for the computer is tracking each target so that the computer knows which target moved to which new location. This problem is known as correspondence.

The present invention helps the computer in its job of tracking correspondence by observing all of the targets over a few frames of motion and determining which targets are moving at a greater velocity or which targets are bunched closer together. It is these targets that must be tracked more often, or segregated to separate frames, because it is the relative position of these targets observed from frame to frame which provide the most information as to the motion of the subject. Once the algorithm has determined which are the more "important" targets to be observed, it alters the coded signal being sent to the target activation device so that the "important" targets are illuminated more often than less important targets. In this way the computer has less targets to track and can therefore perform the tracking of the subject using less computer power in a time period that approaches "real time".

It should be understood that as the scene changes, some groups of targets that were once "important" targets, become less important and some targets that were not so "important" become more important. The algorithm must take account of this and send coded instructions to turn on, less often, the newly less important targets and to turn on, more often, the newly important targets. In other words, the algorithm dynamically sends coded instructions for the activation of the multiplicity of targets.

To assist the algorithm, those areas of the subject that have large and rapid degrees of motion are treated with more than one target located in a very close relationship. Two such areas that typically have dual targets 122 and 124 located therein and represent the left wrist and left ankle of the subject. Such dual targets are shown in both FIGS. 3 and 4.

Figure 5:
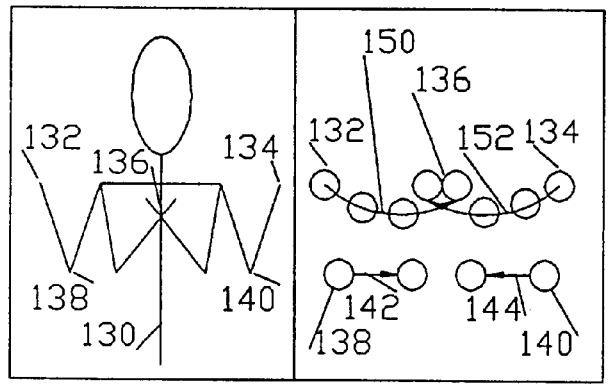
FIG. 5 is a diagram used to explain occlusion.

The other problem with motion tracking as was mentioned above is occlusion as is explained with the aid of FIG. 5.

FIG. 5 shows the upper torso of a subject 130, having arms which will move from an outwardly extended position shown at location 132 and 134 to an inward position 136. The second part of FIG. 5 shows the motion of targets located on the elbow and the wrist of the subject. Elbow targets 138 and 140 move in a relatively simple and relatively slow motion as indicated by arrows 142 and 144. On the other hand wrist targets 146 and 148 move in a much more complicated path shown by arrows 150 and 152. In order to determine the exact location of the wrist targets, the computer illuminates these targets in each consecutive frame of the observing camera. This is shown by intermediate locations of the targets. The computer, via its algorithm, only illuminates the elbow targets every fourth frame. In this way, the computer intensifies its target tracking of the wrists and so it can detect the crossing of the hands of the subject which causes an occlusion of at least some targets from the observation of at least one camera as one wrist crosses over the other as the hands are crossed. In this way the computer can distinguish between a hand crossing and a hand clap.

Figure 6:
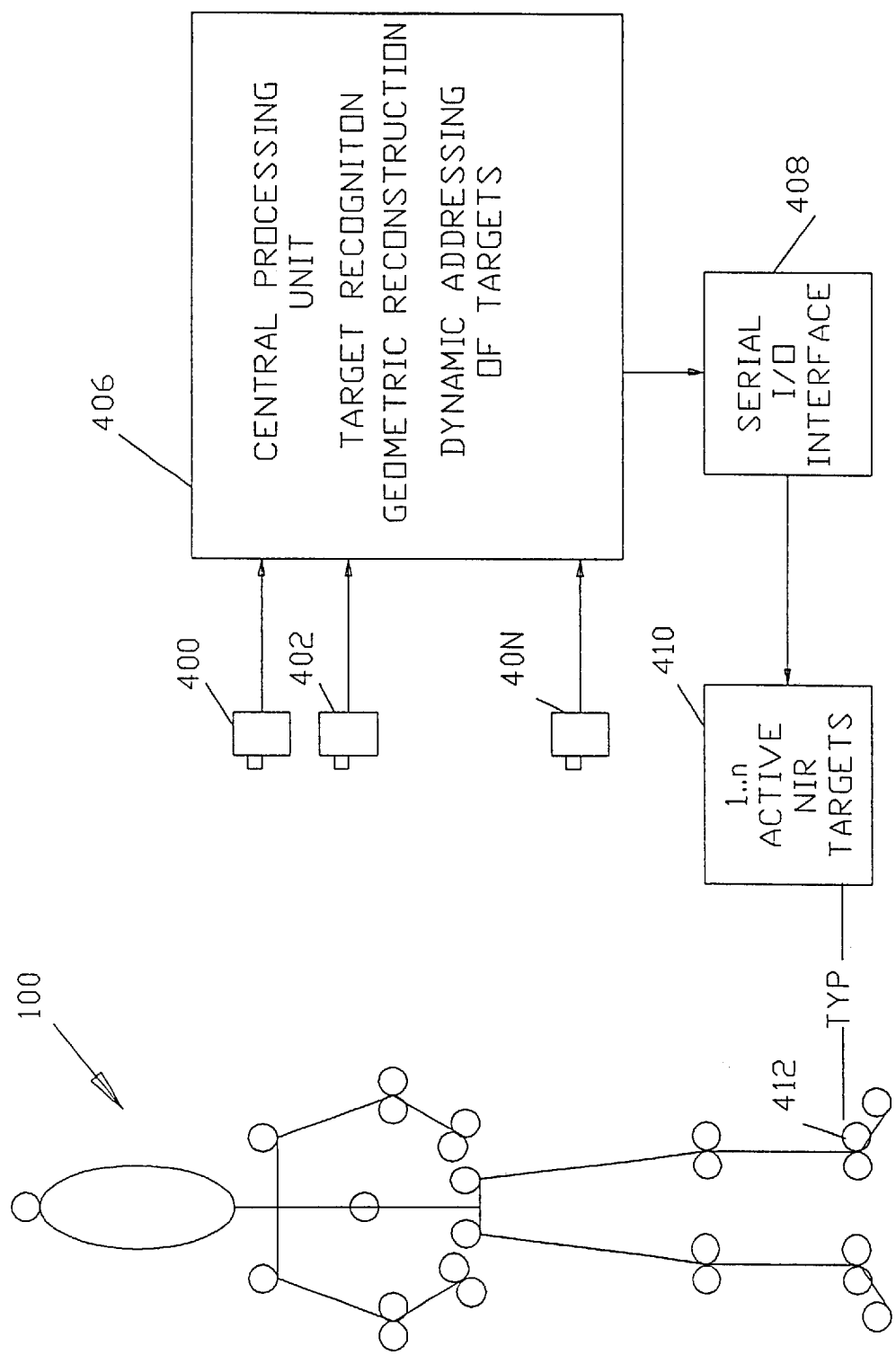
FIG. 6 is a block diagram of a particular embodiment of the present invention.

FIG. 6 is a block diagram of one embodiment of the present invention. N number of cameras 400, 402, to 40N view a scene which includes the subject 100, the motion of which is to be tracked. Typically there are at least 3 cameras viewing the scene, these cameras being placed along orthogonal axes. The video information, on a frame by frame basis from each of the cameras is fed into a computer 406. This video information can be handled in a variety of ways. One brute force method provides a camera input to the computer for each camera in the array. Each input is connected to a frame grabber card with its associated memory. Each frame grabber card digitizes each horizontal line of scan of each frame and detects the presence of targets in that manner.

The computer 406, once it has digitized the information received by the camera array, in order to determine the most efficient method for future motion tracking processing, processes the position information of the various targets located on the subject using a target selection algorithm that finds groups of targets that fall within particular criteria. That criteria could be that the targets are moving rapidly with respect to other targets and/or the targets are close together and are targets that might therefore go through an occlusion process. In any event, the algorithm determines that these groups of targets are "important" or more important to determining the motion tracking of the subject than other groups of targets. The computer 406 encodes a serial signal concerning the illumination of all of the targets and sends this serial signal, via a serial I/O interface 408 to a data communications module DAQ 410. DAQ 410 is located on the subject 100.

In one embodiment of the present invention, the connection between the I/O interface 408 and DAQ 410 is a light twisted pair. As a result, the mobility of the subject is not impaired by this connection. This connection, as was mentioned above, could also be made by a wireless connection. DAQ 410 is connected by small wires to each and every target. For the sake of simplicity, only one connection is shown between DAQ 410 and a target 412. The connection is shown as being typical of all such connections. DAQ 410 decodes the serial signal from I/O interface 408 and, in sync with each of the cameras illuminates groups of targets by supplying energy thereto. In this way, feedback is obtained between the camera, computer on the one hand and the illuminating targets on the other via the serial I/O interface and the DAQ.

The result of such a feedback allows particular targets or groups of targets to be illuminated more often and therefore tracked more often on the one hand and other particular targets or groups of targets to be tracked less often. In this way the total amount of computational power needed to determine the motion of a subject is reduced.

Figure 7:
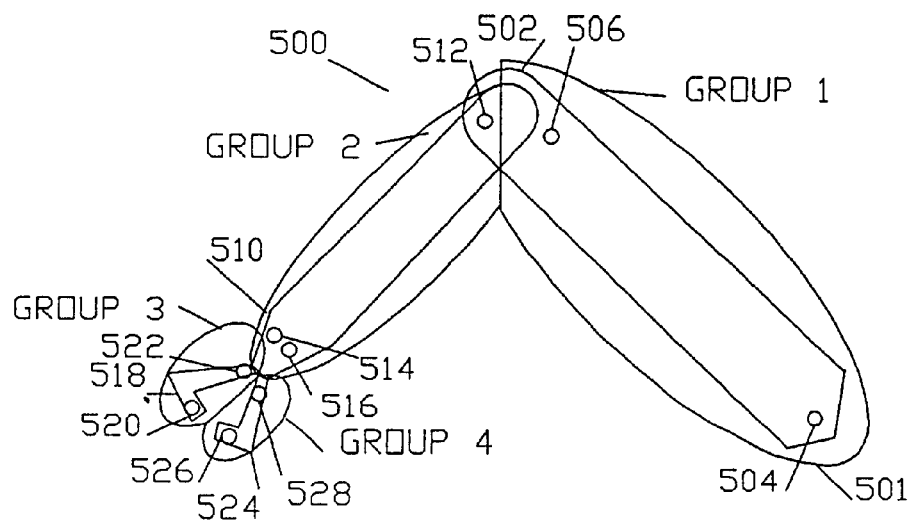
FIG. 7 is a schematic diagram used to explain the grouping of targets in accordance with one aspect of the present invention.

FIG. 7 explains the grouping technique. FIG. 7 shows a robotic arm 500, comprised of two articulating parts forming the arm and two grabber elements forming a hand. The arm portions, wrist and grabbers have targets located thereof that are represented in the figure by the small circles. The targets can be grouped together and for the purposes of illumination, be considered together. Group 1 covers the arm from the shoulder 501 to the elbow 502 and includes targets 504 and 506. Group 2 covers the forearm from the elbow 502 to the wrist 510 and includes targets 512, 514 and 516. Group 3 covers one grabber 518 including targets 520 and 522. Finally Group 4 covers the other grabber 524 and includes targets 526 and 528.

Group 1 targets are connected to that part of the arm that does not move relatively rapidly or with a great degree of freedom of motion. As a result, the algorithm when tracking the targets in group 1 might choose to illuminate them only once every 4 frames of video information.

Group 2 targets are connected to a part of the robotic arm that moves more both from the standpoint of speed and degrees of freedom. This group of targets are more "important" in determining the motion of the overall subject and might be illuminated every $3^{rd}$ frame.

Finally, the group 3 and 4 targets move very quickly and have a great deal of freedom of motion and so these targets would be illuminated every frame.

In this way, by managing the number of targets illuminated per frame, the computer can minimize the amount of computational power required to solve the correspondence problem from frame to frame, hence can determine the motion of the various targets and therefore the motion of the subject.

The present invention has been described with respect to a 3-dimensional environment and a complex subject. However, there is application for this invention in a system that uses only one camera but many targets, and is used to track objects in 2-dimensions. As a result, the scope of this application is meant to cover the use of a single camera operating in a 2-dimensional environment.

What is claimed is:

1. A system for use in dynamically tracking the movement of a deformable subject comprising:

a plurality of active targets for location on the subject at positions of movement of the subject;

two or more camera means for viewing the subject, each said two or more camera means having as an output a video signal;

a computer means for receiving the video signal of each of said two or more camera means, said computer means processing each said video signal by means of an algorithm program to produce a control signal; and control means connected to said computer means and to said plurality of active targets, said control means receiving said control signal and processing said control signal to produce activation signals for selectively activating ones or groups of said active targets so that said computer means can determine the movement of said active targets and thereby determine the movement of the subject;

wherein the algorithm program recognizes and selects targets or groups of targets that are moving either relatively quickly with respect to other targets or are relatively close to one another and processes the control signal to illuminate these selected targets or groups of targets more often that those targets not selected; and wherein each of said two or more camera means is synchronized so that each camera means begins the scan of a frame at the same time.

2. The system according to claim 1, wherein the active targets are near infrared light emitting diodes.

3. The system according to claim 1, wherein the computer means produces said control signal as a serial control signal and a serial I/O interface is located between said computer means and said control means.

4. The system according to claim 1, wherein each of said two or more camera means is a CCD device and each of said two or more camera means has a lens, said lens being covered by a filter means which inhibits the passage of visual light and allows the passage of near infrared energy, so that the video signal output from each of said two or more camera means includes information concerning either the presence of a target or the absence of a target on a frame by frame basis.

5. The system according to claim 1, wherein the algorithm program additionally dynamically selects targets or groups of targets to be illuminated in each frame of the video signal, decided by rules-based criteria based on at least one factor selected from a group of factors including previous occlusion of targets, elapsed time since target last observed, subject kinematic constraints and available computing resources.

6. The system according to claim 1, wherein the algorithm program additionally dynamically selects targets or groups of targets to be illuminated in each frame of the video signal, decided by rules-based criteria based on at least one factor selected from a group of factors including previous occlusions of a target, kinematic constraints of said subject, predicted motion of a target, anticipated correspondence of targets, and available computing power.

7. The system according to claim 1, wherein the illumination of said plurality of active targets is synchronized with the synchronization of said two or more camera means.

8. The system according to claim 7, wherein said targets or groups of targets that are selected are illuminated for every frame of said two or more camera means and said targets or groups of targets not selected are illuminated at a rate that is less but synchronized with the frame rate of said two or more camera means.

9. A method of dynamically tracking the movement of a deformable subject comprising the steps of:

placing an array of active targets on the subject, said targets being located at positions of movement of said subject;

illuminating each of the array of active targets;

observing the illumination of said array of active targets with two or more camera means, each camera means of said two or more camera means providing a video signal;

processing each said video signal by a computer means using an algorithm program to provide a control signal;

processing said control signal with a target illumination control device connected to the computer means and the array of active targets to control the illumination of targets or groups of targets in the array of active targets; and synchronizing said two or more camera means that each camera means begins the scan of a frame at the same time;

wherein the algorithm program recognizes and selects targets or groups of targets within the array of active targets that are moving either relatively quickly with respect to other targets or are relatively close to one another and processes the control signal to illuminate these selected targets or groups of targets more often that those targets within the array of active targets not selected.

10. The method according to claim 9, wherein the illumination of said plurality of active targets is synchronized with the synchronization of said two or more camera means.

11. The method according to claim 10, wherein said targets or groups of targets that are selected are illuminated for every frame of said two or more camera means and said targets or groups of targets not selected are illuminated at a rate that is less than but synchronized with the frame rate of two or more camera means.

12. The method according to claim 9, wherein the algorithm program additionally dynamically selects targets or groups of targets to be illuminated in each frame of the video signal, decided by rules-based criteria based on at least one factor selected from a group of factors including previous occlusion of targets, elapsed time since target last observed, subject kinematic constrains and available computing resources.

13. The system according to claim 9, wherein the algorithm program additionally dynamically selects targets or groups of targets to be illuminated in each frame of the video signal, decided by rules-based criteria based on at least one factor selected from a group of factors including previous occlusions of a target, kinematic constraints of said subject, predicted motion of a target, anticipated correspondence of targets, and available computing power.

* * * * *